Figure 1:
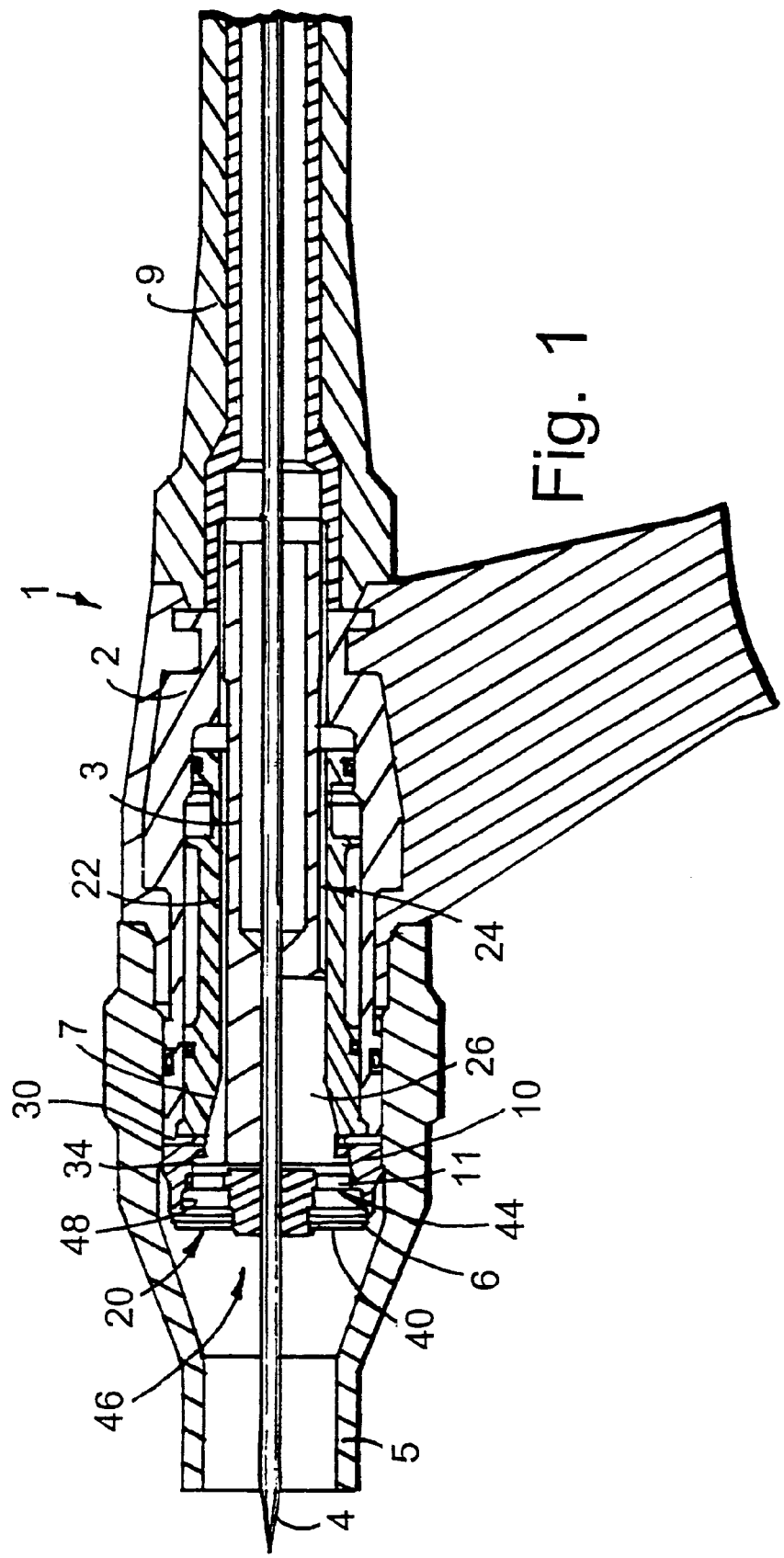

United States Patent

Sperling

[11] Patent Number: 6,037,557
[45] Date of Patent: Mar. 14, 2000

[54] GAS LENS HOUSING FOR ARC-WELDING OR FLAME CUTTERS WITH NON-MELTING ELECTRODES

[75] Inventor: Hermann Sperling, Gau-Bischofsheim, Germany

[73] Assignee: Alexander Binzel GmbH & Co KG, Germany

[21] Appl. No.: 08/945,718
[22] PCT Filed: May 5, 1996
[86] PCT No.: PCT/EP96/01871
§ 371 Date: Jun. 15, 1998
§ 102(e) Date: Jun. 15, 1998
[87] PCT Pub. No.: WO96/34716
PCT Pub. Date: Nov. 7, 1996

[30] Foreign Application Priority Data

May 5, 1995 [DE] Germany .................. 195 16 110
Oct. 12, 1995 [DE] Germany .................. 195 37 988

[51] Int. Cl.[7] .................................. B23K 9/167
[52] U.S. Cl. .................................................. 219/75
[58] Field of Search ............... 219/74, 75, 136

[56] References Cited

U.S. PATENT DOCUMENTS

| 3,053,968 | 9/1962 | Gorman et al. | 219/74 |
| 3,180,967 | 4/1965 | Hill | 219/75 |
| 4,788,401 | 11/1988 | Kleppen | 219/75 |
| 5,393,949 | 2/1995 | Stricklen | 219/74 |
| 5,556,550 | 9/1996 | Fyffe | 219/136 |

Primary Examiner—Clifford C. Shaw
Attorney, Agent, or Firm—Price, Heneveld, Cooper, DeWitt & Litton

[57] ABSTRACT

The invention concerns a gas lens housing (20) for arc-welding or flame cutters with a non-melting electrode (4), in particular for T.I.G. welding. According to the invention, a torch member (1) comprises a housing (2) for accommodating an electrode holder (3) which optionally comprises in a front, downstream section (26) collets (28) with expansion slots (8) for clamping the electrode (4) in place. An annular duct (24) used as a protective gas duct is formed between the electrode holder (3) and a housing casing (22) and a gas lens (6) is disposed in the annular duct (24) or torch nozzle (5). The gas lens housing (20) is mounted with play at a front end (30) of the electrode holder (3).

10 Claims, 2 Drawing Sheets

GAS LENS HOUSING FOR ARC-WELDING OR FLAME CUTTERS WITH NON-MELTING ELECTRODES

DESCRIPTION

The invention pertains to a gas lens housing for arc welding or cutting torches, to be specific WIG-Torches, with a torch body with a housing for securing an electrode holder, which can have collet chucks with expansion slit as clamping fixture for the electrode in a frontal downstream section, where a ring channel is created as a protection channel between the electrode holder and a housing jacket of the housing and with a gas lens attached to this ring channel.

Gas lens housings or gas lenses of that variety are designed at the exit of the protection channel of an arc welding or cutting torch, so that the inert gas can exit the torch in a laminar flow, surround or cover the electrode and in this condition reach the welding site without being mixed with the atmospheric air. The gas lenses could be e.g. of sintered metal plates, as those described in DE-GM 84 05 922, or it can also be of pressed steel wool or metal wire mesh sieve.

In torches of the initially mentioned type, the gas lenses are fastened within a gas lens housing, in which for instance the sintered metal plates or the fine wire mesh sieves are secured on the guide pipe with a retainer ring, as is described in DE-AS 1 295 328. It is also possible to fasten the sintered metal plate to the guide pipe by heading the outer end. Such an arrangement is described for instance in DE 37 28 185 A1.

Furthermore, it is already common to screw or solder the gas lens housing to the adapter sleeve housing of the torch.

Generally, the gas lens contains a center bore, which is pushed over the front end of the adapter sleeve housing or the collet chuck of the electrode holder. A disadvantage in this familiar arrangement is, for instance, that, when spray or beads of weld form at the front end of the electrode and the gas jet has to be changed, the gas lens or sections of it tend to stick to those sprays or beads on the electrode, and there is danger of damaging the gas lens or the gas jet.

Contrary to this, the invention has the objective to further the design of the initially mentioned gas lens housing with attached collet chuck in such a manner, that a trouble free exchange of the gas jet is possible and, according to a side aspect of the invention, an optimal atmosphere for the inert gas is created in the area of the electrode.

The objective of the invention is further met by the fact, that the gas lens housing is affixed with play at the front end of the electrode holder.

Because of this measure it is possible to securely fasten the contracting collet chuck of the electrode holder in radial direction, while still fastening the gas lens housing securely to the electrode holder. If during the welding, sprays or beads of weld have gathered on the front end of the electrode, just a torch cap of the torch body has to be loosened, which also loosens the clamping holder of the electrode by the collet chuck, so that the electrode can be removed from the electrode holder without problem. Because the electrode can be simply removed from the frontal downstream section of the electrode holder when the collet chuck is loosened, the danger of damaging the gas lens is safely avoided. Moreover, according to the invention, the fastening of the gas lens housing to the front end of the electrode holder does not diminish the function of the collet chuck to fasten the electrode.

An advantageous development of the invention determines that the gas lens housing can turn around the longitudinal axis of the electrode holder and is possibly held to the electrode holder with low axial play. This ensures an exact alignment and fastening of the collet chuck, which especially tends to move in radial direction when clamping tight the electrode, even though these collet chucks assume additionally the function of fastening the gas lens housing.

A further advantageous further development of the invention determines for the electrode holder or the collet chuck to have protuberances like a kind of ring flange directed radially to the outside, while the electrode holder is stuck through a central bore in the bottom of a pot shaped outer part of the gas lens housing, so that the outer part is able to be turned in a kind of hasp on the front end of the electrode holder. Thus the protuberances, that are radially extending to the outside on the front end of the electrode holder, act as holding arm for fastening the outer part of the gas lens housing.

For holding the gas lens housing to the electrode holder, it is intended for the pot shaped receptacle of the outer part to contain a holding element, through which inert gas can pass and which is firmly connected to the outer part, e.g. though a locking, deformation, interference fitting or the like, where the protuberances that are facing to the outside are established with play between the bottom of the outer part and the holding element. Because of the advantageous design, the gas lens housing or at least an outer part of the gas lens housing is fixed securely and with play to the electrode holder.

Also, the radially to the outside directed protuberances are to have a radial length, which surpasses the maximum lift of the collet chuck of the electrode holder for fastening the electrode in the housing. A secure hold with play of the gas lens housing on the electrode holder is, therefore, even then safeguarded, when the collet chucks of the electrode holder are moved radially to the inside in the direction of a middle longitudinal axis of the electrode holder An advantageous model of the invention has designed as fasting element a punched disk with several holes through which the inert gas can flow and which has a aperture in the center for the electrode to pass through.

Still, according to another advantageous and independent model of the invention, the possibility exists for designing the holding element as an impeller wheel, a rotor or the like, so that the holding element and the outer part together under the influence of the permeating inert gas can rotate around the longitudinal axis of the electrode holder. Because of this design, the inert gas is exposed to windup and is carried out of the gas lens, which has been shown to be advantageous for stabilizing the arc. This measure specifically prevents the arc from wandering.

It is, of course, understood with the last mentioned model, that the gas lens housing is designed in such a way that it can rotate freely around the longitudinal axis of the electrode holder, even when the electrode is fastened in the electrode holder.

In an advantageous model of the invention, the holding element is fastened on the interior side wall of the outer part with an initial ring step, ring nut or the like.

In order to achieve a further equalization of the inert gas volume flowing from the gas lens, there is a second ring step, ring nut or the like, in downstream direction of the first ring step, in which one or several sieves are able to be locked or fastened.

Beyond that, it has been proven advantageous for the sieve(s) to be able to be locked or fastened with a central bore in a ring nut or the like of a jacket section of the holding element. This holds the normally quite flexible sieve(s) securely and permanently in the gas lens housing.

Other advantages, and application possibilities of the present invention arise from the subsequent description of a design model with the aid of the drawings.

Figure 2:
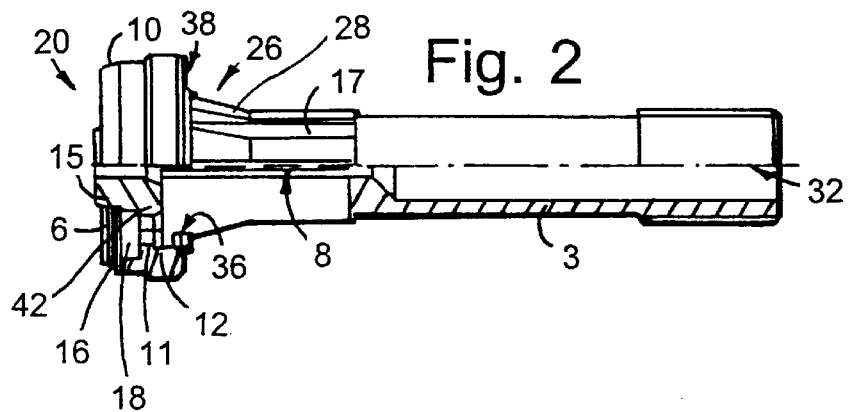
Figure 3:
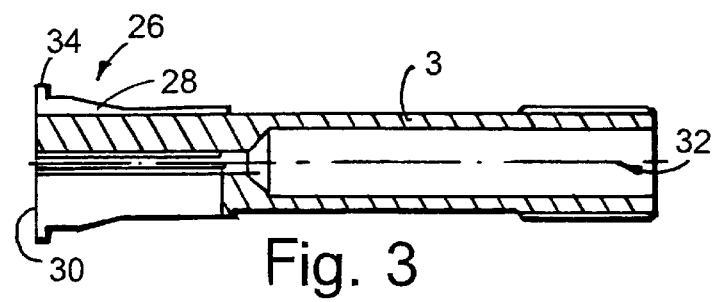
Figure 4:
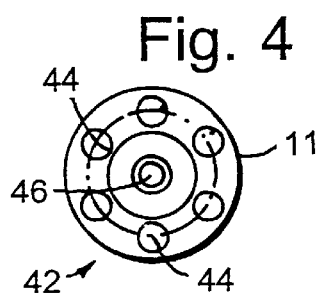
Figure 5:
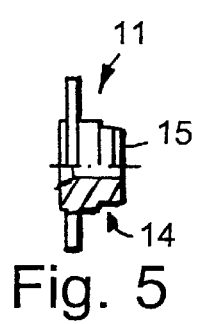
Figure 6:
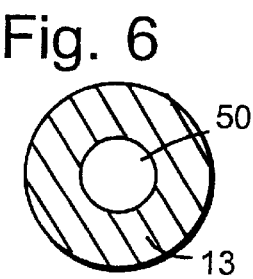

The following is shown in:

FIG. 1 a WIG-Torch with an electrode holder with a collet chuck and with a gas lens that is attached with play, FIG. 2 the electrode holder with attached gas lens according to FIG. 1, FIG. 3 a cutaway representation of the electrode holder of FIGS. 1 and 2, FIG. 4 a top down illustration of a holding element that is designed as a punch disk FIG. 5 a side view of the holding element of a FIG. 4, shown in partial cross section and enlarged scale, FIG. 6 a sieve of the gas lens.

The arc welding or cutting torch of FIG. 1 is designed as air cooled WIG-Torch and contains a torch body 1 with a housing 2 for holding an electrode holder 3. And an electrode 4 is clamped into this electrode holder 3. The front end of the torch body 1 contains a torch jet 5, and for better distribution of the inter gas flowing out of the torch jet 5, a gas lens 6 is provided for within the torch jet 5. This gas lens 6, which is fastened in a gas lens housing 20, assist in ensuring the laminar flow of the inert gas stream and improved covering of the welding spot. The inert gas is guided to the gas lens 6 via a ring channel 24, which is formed between a housing jacket 22 of the housing 2 and the electrode holder 3. The gas lens 6 and/or the gas lens housing 20 are arranged in the ring channel 24 or in the torch jet 5.

The housing 2 of the torch body 1 contains a cone shaped seat 7 for the electrode holder 3. During assembly, the torch cap 9 is screwed on the back end of the electrode holder 3, which pulls the electrode holder 3 into the cone shaped seat 7. At the same time, the collet chuck 28 or the expansion slits 8 of the electrode holder 3 are drawn together, preferably to the inside, while the electrode 4 is clamped tightly inside the electrode holder 3.

In this design model, the collet chuck 28 with the expansion slits 8 is arranged in a frontal downstream section 26 of the electrode holder 3. At the same time, the gas lens housing 20 is held with play to a front end 30 of the electrode holder 3. Thus it is possible to achieve an exact alignment and fastening of the collet chuck <26 or the electrode holder> 3 which when being tightened moves to the inside.

Furthermore, the gas lens housing 20 is able to rotate and is held, only with little axial play, on the electrode holder 3 around a longitudinal axis of the electrode holder 3. Moreover, the gas lens housing 20 contains a ring or pot shaped outer part 10, which has a central bore 36 in the bottom 38. The electrode holder 3 is pushed through this central bore 36, while on the electrode holder 3 or the collet chuck 28, there are protuberances 34 that are facing to the outside and are shaped like a ring flange, which overlap the bottom 38. In all, the outer part 10 is designed to be turned like a screw cap on the front end 30 of the electrode holder 3.

A holding element 42, through which the inert gas flows and which is firmly connected to the outer part 10, for instance with locking, deformation, interference fitting or the like, is inserted into the receptacle 40 of the outer part 10, which is open to the torch jet 5. The protuberances 34 of the electrode holder 3 that are facing to the outside are gripped between the bottom 38 of the outer part 10 and the holding element 42.

The holding element 42, especially that in FIG. 4 of the design model, is shaped like a punched disk 11 and this punch disk 11 contains several holes 44 through which the inert gas flows, as well as a central aperture 46 through which the electrode 4 is inserted. The holding element 42 of the punched disk 11 can be fastened to the outer part 10 with a first ring step 12, ring nut or the like, in a interior side wall 48 of the outer part 10.

It is understood, that the radial length of the protuberances 34 that extend to the outside surpasses the maximum lift of the collet chuck 28 of the electrode holder 3 when clamping the electrode 4 into the housing 2. This ensures, that the gas lens housing 20 is securely fastened to the electrode holder 3, even when the collet chucks 28 are rotated to the inside along middle longitudinal axis 32 of the electrode holder 3.

In another model the holding element 42 can be designed as an impeller wheel, a rotor or the like, and together with the outer part 10 under the influence of the permeating inert gas can be made to rotate around the longitudinal axis 32 of the electrode holder 3. A real benefit is, that the gas lens housing 20 is designed to freely rotate around the longitudinal axis 32 of the electrode holder 3 even when the electrode 4 is fastened in the electrode holder 3 within the housing 2 of the torch body 1.

During the assembly of the gas lens housing 20, after the holding element 42 has been set upon the first ring step 12 and fastened on the gas lens housing by interference fitting or deformation, one or more sieves 13 are locked or fastened with a central bore 50 to a ring nut 14 on an jacket section 15 of the holding element 42 or else on the punched disk 11. At this time, the outer edge of the sieve 13 is locked into a second ring step 16 or into a ring nut in the interior side wall 48 of the outer part 10.

These sieves 13 serve to equalize the volume of the inert gas stream across the whole area of the gas lens. Furthermore, the holding tank 18, which is formed between the holding element 42 or the punched disk 11 and the sieves 13, also ensures that the inert gas flowing through the punched disk 11 converges evenly and homogeneously upon the sieve 13 of the gas lens 6.

It remains to be noted, that the punched disk 11 can be designed in one piece construction with the jacket section 15 as a swivel part. The same is true for the outer part 10, so all in all, the resulting assembly of the gas lens housing 20 is of very simple construction.

The described design model also contains longitudinal channels 17, which are arranged over the circumference of the electrode holder 3, for conduction the inert gas to the gas lens 3. There is also the opportunity to design corresponding openings in the area of the bottom 38 of the outer part 10 for passage of the inert gas to the gas lens housing.

LIST OF REFERENCE NUMBERS

1—Torch body
2—Housing
3—Electric holder
4—Electrode
5—Torch jet
6—Gas lens
7—Seat
8—Expansion 9—Torch cap
10—Outer part
11—Punched disk
12—First ring step
13—Sieve
14—Ring nut
15—Jacket section
16—Second ring step
17—Longitudinal channel
18—Holding tank
20—Gas lens housing
22—Housing jacket
24—Ring channel
26—Front section
28—Collet chuck
30—Front end
32—Longitudinal axis
34—Fitting
36—Bore
38—Bottom
40—Receptable
42—Holding element
44—Hole
46—Aperature
48—Interior side wall
50—Bore

I claim:

1. A gas lens housing (2) for arc welding or cutting torches with a non-consumable electrode (4), a torch body (1) with a housing (2) for receiving an electrode holder (3), the electrode holder (3) being provided with collet chucks (28) and expansion slits (8) in a front, down stream section (26) to fasten the electrode (4) in a clamping attachment, where a ring channel (24) as protective channel for an inert gas is formed between the electrode holder (3) and a housing jacket (22) of the housing and where a gas lens (6) is fitted into the ring channel (24) or the torch jet (5) characterized by the fact that the gas lens housing (2) is mounted at the front end (30) of the electrode holder (3) or the collet chucks (28) and held with axial play.

2. Gas lens housing according to claim 1, characterized by the fact that the electrode holder (3) or the collet chuck (28) exhibits protuberances (34) that are directed radially to the outside on its front end and that the electrode holder (3) is pushed through a central bore (36) in the bottom (38) of a pot shaped outer part (10) of the gas lens housing (20), so that the outer part (10) can be turned on the front end (30) of the electrode holder (3).

3. Gas lens housing according to claim 2, characterized by the fact that a holding element (42), through which the inert gas freely flows, is inserted into the pot shaped receptacle (40) of the outer part (10) and which is firmly connected to the outer part (10) with locking, deformation, interference fitting, while the protuberances (34) that are directed to the outside are clasped between the bottom (38) of the outer part (10) and the holding element (42).

4. Gas lens housing according to claim 3, characterized by the fact that the holding element (42) is locked in the interior side wall (48) of the outer part (10) by a first ring step (12) ring nut or the like.

5. Gas lens housing according to claim 3, characterized by the fact that there is a second ring step (16), in downstream direction of the first ring step (12), in which one or several sieves (13) are able to be locked or fastened.

6. Gas lens housing according to claim 5, characterized by the fact that the sieve or sieves (13) can be locked or fastened with a central bore (50) in a ring nut (14) of a jacket section (15) of the holding element (42).

7. Gas lens housing according to claim 2, characterized by the fact that the radial length of protuberances (34) that are directed to the outside is such as to surpass the maximum lift of the collet chuck (28) of the electrode holder (3) for fastening the electrode (4) in the housing (2).

8. Gas lens housing according to claim 2, characterized by the fact that the holding element (42) includes several holes (44) through which inert gas can flow, with a central aperture (46) as passage for the electrode (4).

9. Gas lens housing according to claim 2, characterized by the fact that the holding element (42) together with the outer part (10) rotates around the longitudinal axis (32) of the electrode holder (3) when affected by the permeating inert gas.

10. Gas lens housing according to claim 1, characterized by the fact that the gas lens housing (20) freely rotates around the longitudinal axis (32) of the electrode holder (3) when the electrode (4) is fastened in the electrode holder (3) within the housing (2) of the torch body (1).

* * * * *

UNITED STATES PATENT AND TRADEMARK OFFICE
CERTIFICATE OF CORRECTION

PATENT NO. : 6,037,557
DATED : March 14, 2000
INVENTOR(S) : Hermann Sperling

It is certified that error appears in the above-indentified patent and that said Letters Patent is hereby corrected as shown below:

Column 2, Line 9:

Delete "further " (second occurrence);

Column 4, Line 6:

"punch disk 11" should be - -punched disk 11- -;

Column 4, Line 53:

After "conduction" insert - - of- -;

Column 4, Line 61:

"Electric " should be - -Electrode- -;

Column 4, line 66:

After "expansion" insert - -slit- -;

Signed and Sealed this

Twentieth Day of March, 2001

Attest:

NICHOLAS P. GODICI

Attesting Officer

Acting Director of the United States Patent and Trademark Office